United States Patent
Barijough et al.

(10) Patent No.: US 10,735,367 B2
(45) Date of Patent: Aug. 4, 2020

(54) ELECTRONIC MESSAGE MANAGEMENT BASED ON COGNITIVE LOAD

(71) Applicant: FUJITSU LIMITED, Kawasaki-shi, Kanagawa (JP)

(72) Inventors: Sanam Mirzazad Barijough, Morgan Hill, CA (US); Jorjeta G. Jetcheva, San Jose, CA (US); Ajay Chander, San Francisco, CA (US)

(73) Assignee: FUJITSU LIMITED, Kawasaki (JP)

( * ) Notice: Subject to any disclaimer, the term of this patent is extended or adjusted under 35 U.S.C. 154(b) by 322 days.

(21) Appl. No.: 15/668,641

(22) Filed: Aug. 3, 2017

(65) Prior Publication Data
US 2019/0044907 A1 Feb. 7, 2019

(51) Int. Cl.
*H04L 12/58* (2006.01)
(52) U.S. Cl.
CPC .............. *H04L 51/26* (2013.01); *H04L 51/12* (2013.01); *H04L 51/22* (2013.01)
(58) Field of Classification Search
CPC ......... H04L 51/26; H04L 51/22; H04L 51/12; H04L 51/16; G06Q 10/107
See application file for complete search history.

(56) References Cited

U.S. PATENT DOCUMENTS

| | | | |
|---|---|---|---|
| 8,032,602 B2 | 10/2011 | LaVoie et al. | |
| 9,503,399 B1 | 11/2016 | Avital et al. | |
| 2002/0078204 A1* | 6/2002 | Newell | G06F 1/163 709/225 |
| 2002/0151297 A1* | 10/2002 | Remboski | B60R 16/0231 455/414.1 |
| 2007/0168430 A1 | 7/2007 | Brun et al. | |
| 2010/0211644 A1* | 8/2010 | Lavoie | G06Q 10/107 709/206 |
| 2015/0200899 A1* | 7/2015 | Sanketi | H04L 51/24 709/206 |
| 2016/0142359 A1* | 5/2016 | Lock | H04L 51/24 709/206 |

(Continued)

OTHER PUBLICATIONS

Gwizdka, J. (2010). Distribution of cognitive load in web search. Journal of the Association for Information Science and Technology, 61(11), 2167-2187.

(Continued)

*Primary Examiner* — Lance Leonard Barry
(74) *Attorney, Agent, or Firm* — Maschoff Brennan

(57) ABSTRACT

A method to prioritize email such that a number of interruptions experienced by a user is reduced may include obtaining a threshold cognitive load of a user and a threshold importance; in response to receiving an email in an inbox of the user, determining an importance of the received email; comparing the importance thereof with the threshold importance; and based on the importance thereof not satisfying the threshold importance, determining a priority thereof with respect to emails in the inbox. The method includes determining a cognitive cost of the received email and that the user is handling a first group of emails, and comparing the priority of the received email with a priority of emails of the first group of emails; obtaining a current cognitive load of the user; and identifying a second group of emails; and presenting the second group of emails to the user.

7 Claims, 8 Drawing Sheets

(56) References Cited

U.S. PATENT DOCUMENTS

2016/0183068 A1* 6/2016 Shen ............... H04W 4/12
455/466
2016/0226811 A1* 8/2016 Kerschhofer .......... H04L 51/26

OTHER PUBLICATIONS

Bennett, P. N., & Carbonell, J. (Aug. 2005). Detecting action-items in e-mail. In Proceedings of the 28th annual International ACM SIGIR conference on Research and development in information retrieval (pp. 585-586). ACM.
Freed, M., Carbonell, J. A, Gordon, G. J., Hayes, J., Myers, B. A., Siewiorek, D. P., . . . & Tomasic, A. (Jul. 2008). RADAR: A Personal Assistant that Learns to Reduce Email Overload. In AAAI (pp. 1287-1293).
McDuff, D., Gontarek, S., & Picard, R. (Aug. 2014). Remote measurement of cognitive stress via heart rate variability. In Engineering in Medicine and Biology Society (EMBC), 2014 36th Annual International Conference of the IEEE (pp. 2957-2960). IEEE.
Bailey, B. P., & Iqbal, S. T. (2008). Understanding changes in mental workload during execution of goal-directed tasks and its application for interruption management. ACM Transactions on Computer-Human Interaction (TOCHI), 14(4), 21.
Petridis, S., Giannakopoulos, T., & Spyropoulos, C. D. (2013). Unobtrusive Low Cost Pupil Size Measurements using Web cameras. arXiv preprint arXiv:1311.7327.
Retrieved Aug. 3, 2017, from https://www.thrive.email/.
Artificial Intelligence messaging product and features. (n. d.). Retrieved Aug. 3, 2017, from https://www.knowmail.me/products/.
Excel VBA Code to retrieve e-mails from outlook. (n. d.). Retrieved Aug. 3, 2017, from https://stackoverflow.com/questions/23746344/excel-vba-code-to-retrieve-e-mails-from-outlook.
(N.d.). Retrieved Aug. 3, 2017, from https://support.microsoft.com/en-us/help/306108/how-to-create-a-script-for-the-rules-wizard-in-outlook.
How do I trigger a macro to run after a new mail is received in Outlook? (n. d.). Retrieved Aug. 3, 2017, from https://stackoverflow.com/questions/11263483/how-do-i-trigger-a-macro-to-run-after-a-new-mail-is-received-in-outlook.
Choose Rules > Manage Rules & Alerts from the ribbon or choose the File tab and then choose Manage Rules & Alerts. (n.d.). Retrieved Aug. 3, 2017, from https://support.office.com/en-us/article/Manage-email-messages-by-using-rules-c24f5dea-9465-4df4-ad17-a50704d66c59.

* cited by examiner

ELECTRONIC MESSAGE MANAGEMENT BASED ON COGNITIVE LOAD

FIELD

The embodiments discussed herein are related to electronic message management.

BACKGROUND

With the growth of electronic communication, more and more electronic messages are being received each day by people. For example, some individuals may receive hundreds of emails every day. It can be difficult for an individual to manage all of the electronic communications the individual receives each day.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include obtaining a threshold cognitive load of a user and a threshold user readiness. The method may also include obtaining a current cognitive load of the user and a threshold number of messages. The method may further include obtaining multiple messages. Each message of the multiple messages may be associated with a cognitive cost and a priority. The method may also include obtaining a user readiness. The method may further include identifying a group of messages of the multiple messages in response to the user readiness satisfying the threshold user readiness. A number of messages of the identified group of messages may be greater than the threshold number. The group of messages may have the highest priorities of the messages of the multiple messages. The group of messages may be selected such that a sum of the current cognitive load and a total cognitive cost of the group of messages is less than the threshold cognitive load. The method may also include presenting the group of messages to the user.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
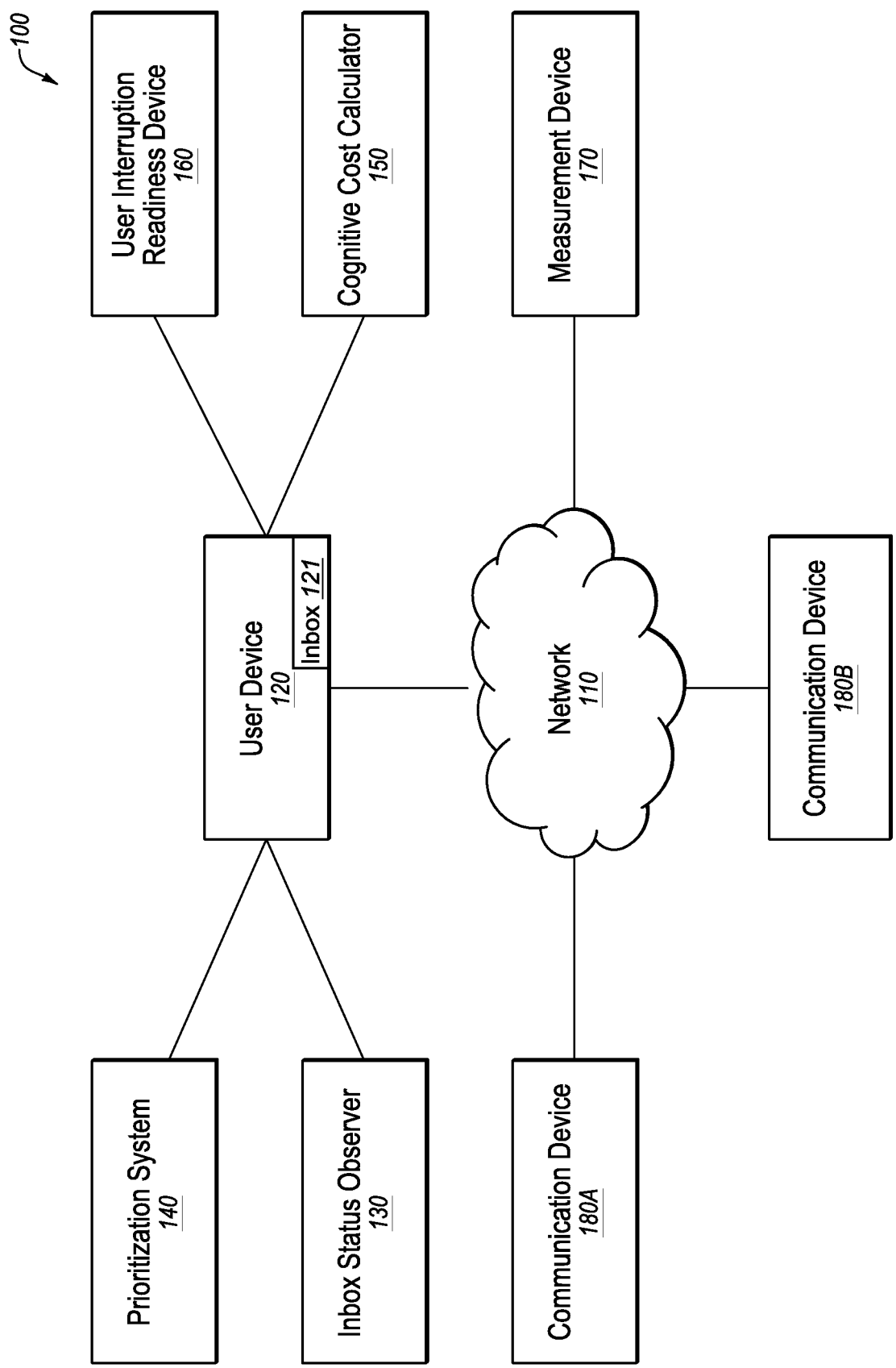
FIG. 1 is a diagram representing an example environment related to electronic message management.
Figure 2A:
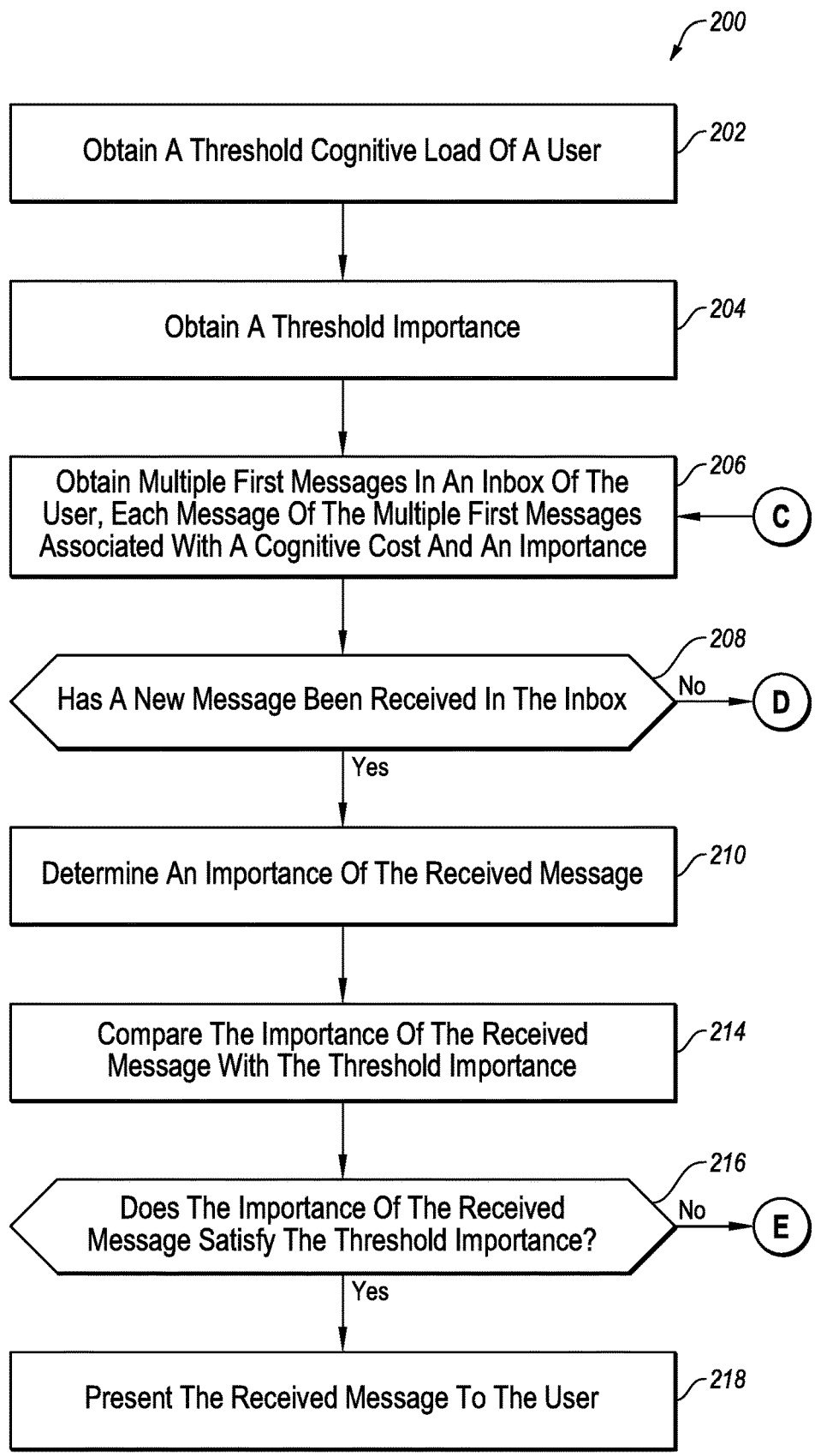
FIGS. 2A, 2B, 2C, and 2D depict an example process of electronic message management.
Figure 2B:
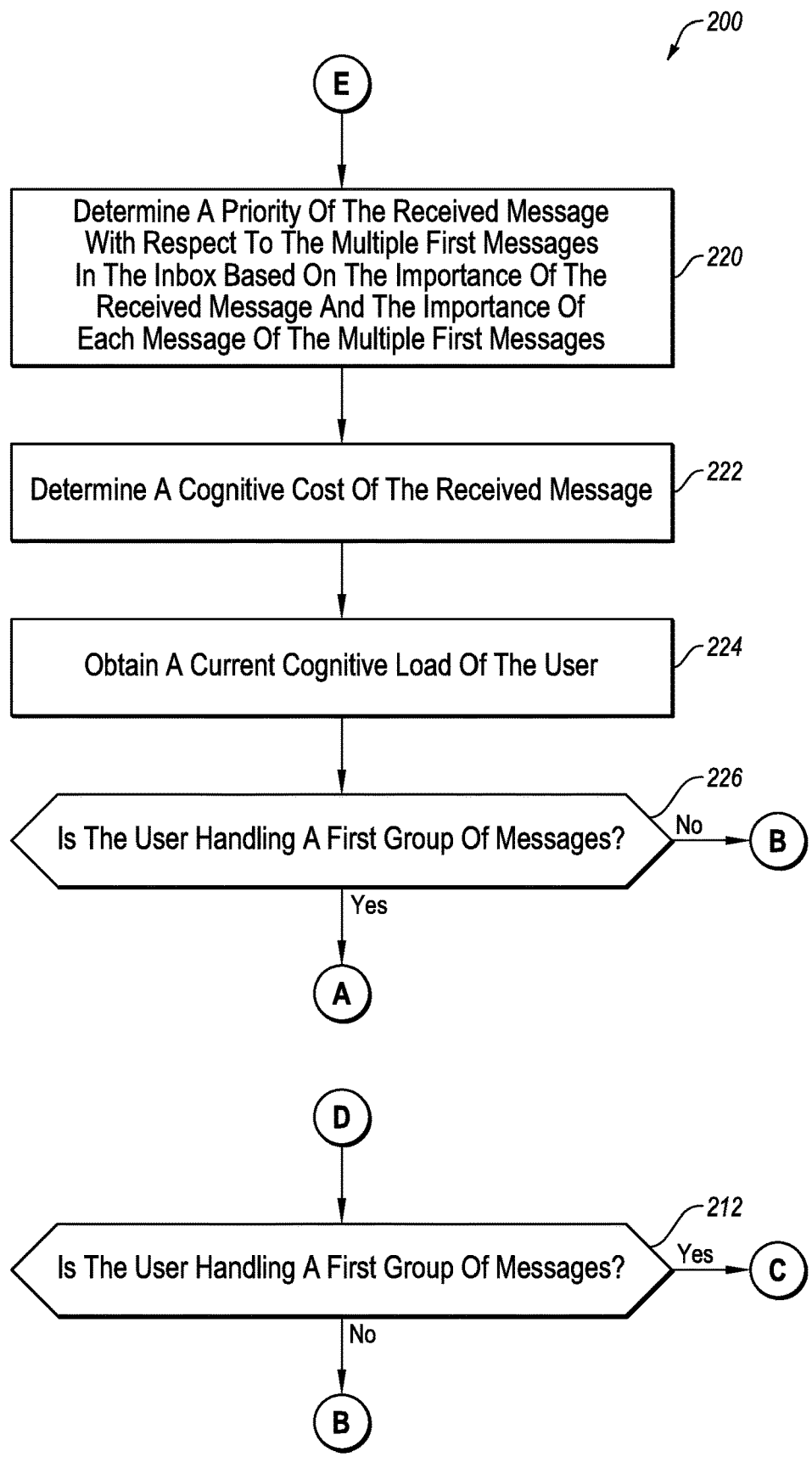
Figure 2C:
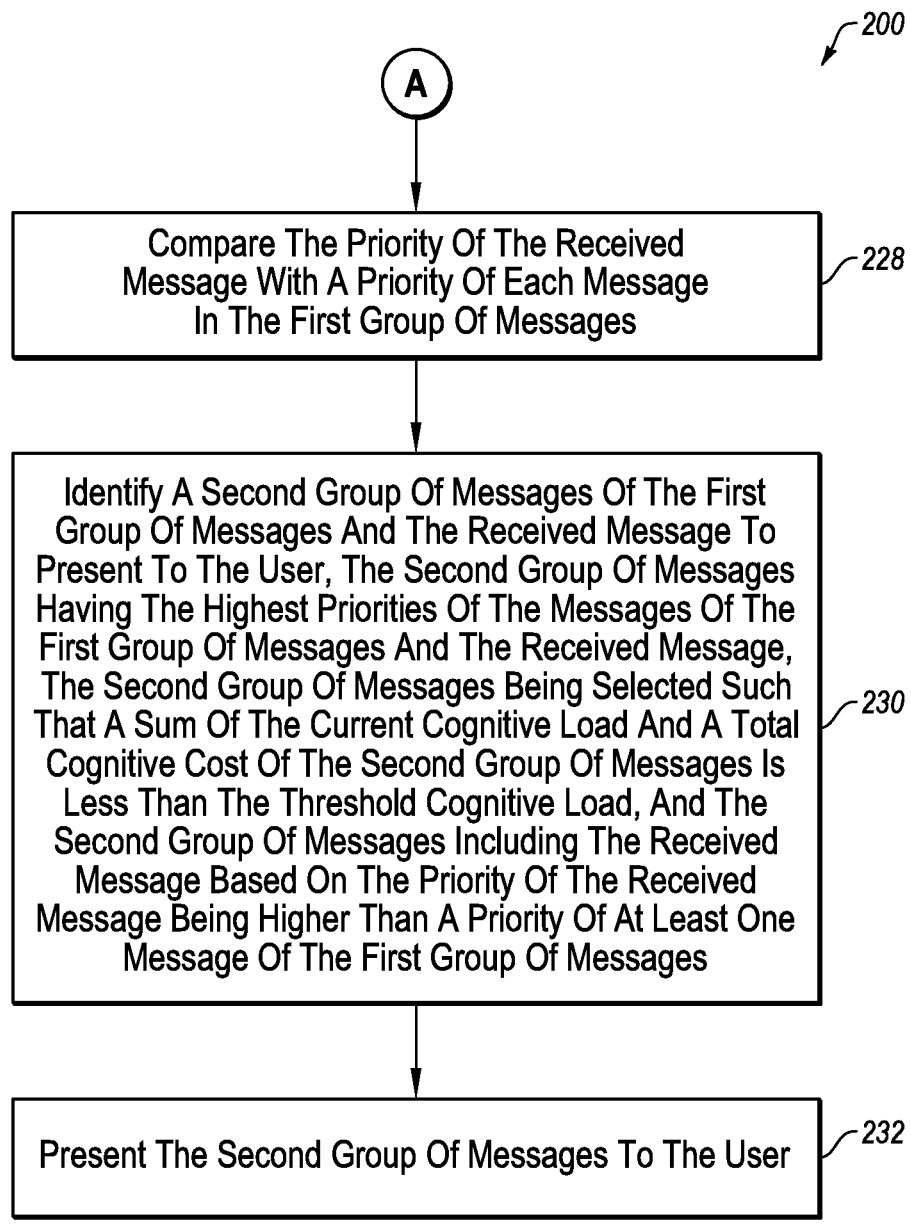
Figure 2D:
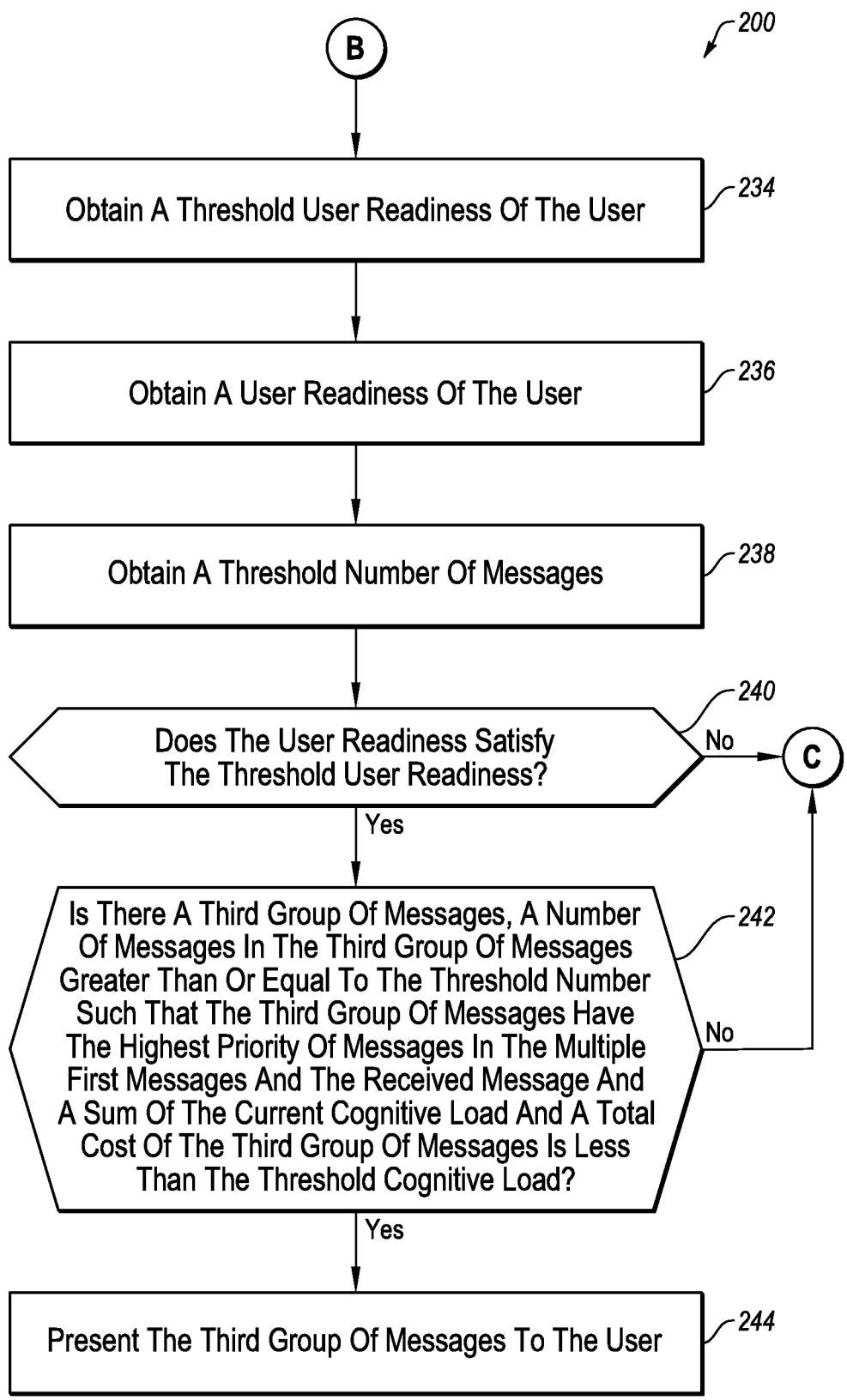

Some embodiments described herein relate to methods and systems of electronic message management. The current business environment often results in many electronic messages being sent to users. The number of messages received by a user of an electronic messaging service may exceed fifty messages, one hundred messages, one thousand messages, or even more messages per day. Responding to the voluminous number of messages received each day may result in lower productivity as a user prioritizes between responding to messages which may have various levels of importance and accomplishing other tasks associated with the workplace. Some of the messages may be less important than others. It may not be easy for a user of a messaging service to discern between messages that may have a higher priority and messages that may have a lower priority. Users may set up filters for an inbox of electronic messages, but filters are static and function based on manually set criteria.

Electronic message management of the present disclosure allows messages in an inbox of a user to be presented to the user based on an automated prioritization when the user has sufficient cognitive capacity to process the messages. In some embodiments, this may facilitate efficient processing of messages as messages with a higher priority may be grouped and may be presented to the user together to reduce disruptions in the user's schedule and to improve the ability of the user to respond to the messages.

According to one or more embodiments described in the present disclosure, a user may receive an email in an inbox of the user. The priority as well as the cognitive cost of the received email may be determined. If the priority of the received email is higher than the priority of any emails of a group of emails that the user is currently handling, the received email may be added to the group of emails and one or more emails with a lower priority may be removed based on the cognitive cost of each of the emails, the current cognitive load of the user, and threshold cognitive load.

Alternatively or additionally, in some embodiments, a group of messages may selected for presentation to the user based on the current cognitive load of the user, the priorities of each message in the inbox of the user, the cognitive cost of each email in the inbox of the user, and the threshold cognitive load of the user. In these and other embodiments, the group of messages may be the messages with the highest priority of the messages in the inbox such that the total cognitive cost of the group of messages does not exceed the available cognitive capacity of the user. Alternatively or additionally, in some embodiments, a threshold number of messages may be presented to the user. For example, in some embodiments, messages may not be presented to the user until there are at least twenty messages for the user to handle. In these and other embodiments, the group of messages may include at least the threshold number of messages when presented to the user.

Embodiments of the present disclosure are explained with reference to the accompanying drawings.

FIG. 1 is a diagram representing an example environment 100 related to electronic message management. The environment 100 may include a network 110, a user device 120, an inbox status observer 130, a prioritization system 140, a cognitive cost calculator 150, a user interruption readiness device 160, a measurement device 170, a communication device 180A, and a communication device 180B.

The network 110 may be configured to communicatively couple the user device 110, the communication device 180A, the communication device 180B, and the measurement device 170. In some embodiments, the network 110 may include any network or configuration of networks configured to send and receive communications between systems and devices. In some embodiments, the network 110 may include a conventional type network, a wired or wireless network, and may have numerous different configurations. In some embodiments, the network 110 may also be coupled to or may include portions of a telecommunications network, including telephone lines such as a public switch telephone network (PSTN) line, for sending data in a variety of different communication protocols, such as a protocol used by a plain old telephone system (POTS).

Each of the user device 120, the communication device 180A, and the communication device 180B may include any electronic or digital computing device. For example, each of the user device 120, the communication device 180A, and the communication device 180B may include a desktop computer, a laptop computer, a smartphone, a mobile phone, a tablet computer, a telephone, a phone console, or any other computing device. In some embodiments, the user device 120, the communication device 180A, and the communication device 180B may each include a computing system configured to perform operations described in this disclosure, among other operations. The computing systems may be similar to the computing system 500 described below with respect to FIG. 5. In some embodiments, the user device 120, the communication device 180A, and the communication device 180B may include computer-readable instructions that are configured to be executed by the user device 120, the communication device 180A, and the communication device 180B to perform operations described in this disclosure.

In some embodiments, each of the user device 120, the communication device 180A, and the communication device 180B may be associated with different users. For example, in some embodiments, the user device 120 may be associated with a first individual in a first organization. In these and other embodiments, the communication device 180A may be associated with a second individual in a second organization. In these and other embodiments, the communication device 180B may be associated with a third individual in a third organization. In some embodiments, the first organization, the second organization, and the third organization may be the same organization. For example, in some embodiments, the first individual, the second individual, and the third individual may be coworkers. In these and other embodiments, the first individual, the second individual, and the third individual may receive at least some messages that may be similar to each other in one or more aspects. For example, the three individuals may receive at least some messages with similar subjects, from similar senders, or at similar times of the day. For example, in some embodiments, the three individuals may be working for the same supervisor.

The user device 120 and the communication devices 180 may be communicatively coupled to each other via the network 110. The user device 120 and the communication devices 180 may also be communicatively coupled with other devices, such as devices associated with other companies, other users, other organizations, or other entities. In these and other embodiments, the user device 120 and the communication devices 180 may receive and send electronic messages via the network 110. The user device 120 and the communication devices 180 may send messages to each other and to other devices not shown in FIG. 1 and may receive messages from each other and from other devices not shown in FIG. 1. For example, each of the user device 120, the communication device 180A, and the communication device 180B may be configured to send and receive email messages via an email server with other devices.

In some embodiments, the user device 120 may include an inbox status observer 130, a prioritization system 140, a cognitive cost calculator 150, and a user interruption readiness device 160, among other devices. In these and other embodiments, the inbox status observer 130, the prioritization system 140, the cognitive cost calculator 150, and the user interruption readiness device 160 may be configured as software, hardware, or a combination of software and hardware to perform operations described below. Additionally, in the present disclosure the inbox status observer 130, the prioritization system 140, the cognitive cost calculator 150, and the user interruption readiness device 160 and their corresponding operations are described and delineated to help facilitate the understanding of different operations that may be performed with respect to the present disclosure. However, depending on certain implementations, such elements may be considered as being part of one or multiple different software or hardware elements that may be organized differently than as specifically described in the present disclosure.

The inbox status observer 130 may be configured to monitor an inbox 121 associated with electronic messages. The inbox 121 is an example inbox and any mention in the present disclosure of an inbox may include (but need not include) reference to the inbox 121. In these and other embodiments, the inbox status observer 130 may be configured to identify when a new message is received in the inbox of a user of the user device 120. For example, the inbox status observer 130 may be configured to identify changes in the inbox. In some embodiments, the inbox status observer 130 may also be configured to identify if a user of the user device 120 is currently handling a group of emails. For example, in these and other embodiments, the inbox status observer 130 may be configured to identify an active application on the user device 120. In these and other embodiments, the inbox status observer 130 may also be configured to identify input associated with input devices such as a keyboard or a mouse. In response to the active application being a messaging application and input being detected from a keyboard or a mouse, the inbox status observer 130 may determine that a user of the user device 120 is currently handling emails. Alternatively or additionally, in some embodiments, the inbox status observer 130 may be configured to identify changes in a folder associated with outbound messages sent by the user. For example, in these and other embodiments, the inbox status observer 130 may determine that the user is handling emails in response to new messages being identified in a "sent" folder of the inbox.

The prioritization system 140 may be configured to prioritize messages in the inbox of the user device 120. In some embodiments, the prioritization system 140 may be configured to receive user-inputted criteria for determining the importance of messages. For example, in these and other embodiments, the user may decide that messages associated with a specific deadline may be more important than messages associated with a later deadline or than messages not associated with a deadline. Alternatively or additionally, in some embodiments, the user may decide that messages associated with a particular subject or messages originating from a particular sender may be more important that messages associated with other subjects or messages originating from other senders. For example, in some embodiments, messages from a supervisor of the user may be classified as more important based on a criteria established by the user.

Alternatively or additionally, in some embodiments, the prioritization system 140 may use machine learning to determine the importance of a message in the inbox. In these and other embodiments, the prioritization system 140 may use the behavior of the user of the user device 120 and users of the communication devices 180 to determine the importance of a message. Alternatively or additionally, the prioritization system 140 may use the behavior of other users to determine the importance of a message. For example, in these and other embodiments, the prioritization system 140 may determine a response time for each message in the inboxes of the user device 120 and the communication devices 180. Alternatively or additionally, in some embodiments, the prioritization system 140 may determine the amount of time passing between a message being received and the message being forwarded or deleted. Alternatively or additionally, the prioritization system 140 may determine the amount of time passing between a message being read and the message being forwarded or deleted. The prioritization system 140 may associate the response times with different characteristics of the messages in the inboxes. For example, the characteristics of the messages may include a time the messages were sent, the senders of the messages, the subjects of the messages, and content of the messages. In these and other embodiments, messages with a faster response time may be identified as more important than messages with a slow response time.

In some embodiments, the prioritization system 140 may identify keywords in the subject and content of messages. In these and other embodiments, the prioritization system 140 may use natural language processing to identify keywords in the messages. In these and other embodiments, keywords may include words such as "urgent," "important," "ASAP," "deadline," and other words associated with urgency or importance. The prioritization system 140 may combine natural language processing for the identification of stated deadlines, user labelling to derive deadlines, and a default deadline for messages with no deadline available. In some embodiments, the default deadline may be "as soon as possible." In these and other embodiments, messages without a deadline may be considered more important than messages with a defined deadline. Alternatively or additionally, in some embodiments, the default deadline may be one month in the future or some other default that may be selected by the user or the prioritization system 140. In these and other embodiments, messages without a deadline may be considered less important than messages with a defined deadline. In these and other embodiments, the prioritization system 140 may determine the importance of a message based on the identification of keywords in the message and based on prior response times to messages with the identified keywords.

In some embodiments, the time remaining until a deadline associated with a message may be a factor in determining the importance of the message. For example, a message with one month until its deadline may be considered less important than a message with one week until its deadline.

In some embodiments, the prioritization system 140 may include social norms in determining the importance of messages in the inbox. Social norms may include determining that messages from a supervisor or manager of the user are more important than messages from other individuals. Alternatively or additionally, social norms may include determining that messages from an individual who responds to messages quickly may be determined to be more important than messages from individuals who respond to messages slowly. In these and other embodiments, social norms may be set as rules by the user of the user device 120. Alternatively or additionally, in some embodiments, social norms may be learned using a machine learning algorithm. In these and other embodiments, social norms may be learned using response times and message characteristics from the user device 120, the communication device 180A, the communication device 180B, and other devices associated with sending and receiving messages. Social norms may include determining that messages from some senders are of lower importance than messages from other senders. Alternatively or additionally, in some embodiments, social norms may include determining that messages with particular subjects or content are of lower importance than messages with different subjects or content. For example, in some embodiments, messages from a particular organization or a particular division in an organization may be determined to be less important than messages from other organizations or other divisions in the organization. Alternatively or additionally, in some embodiments, messages seeking a volunteer may be determined to be less important than other messages.

In some embodiments, messages in the inbox may be prioritized based on the importance of each message. In these and other embodiments, messages with a greater importance may be given a higher priority than messages with a lower importance. In some embodiments, the priority may be determined based on a weighted sum of different importance criteria. For example, in these and other embodiments, some or all of the factors discussed above along with additional factors may be normalized and combined to generate a rank of a message. In these and other embodiments, different factors, such as the sender of the message, the subject of the message, the time the message was sent, the deadline associated with the message, the content of the message, the response time to messages similar to the message, and other factors may be normalized and weighted to produce a rank of the email.

In some embodiments, the prioritization system 140 may rank the messages for each criterion based on a machine learning algorithm and on user feedback. In some embodiments, messages with no associated data may be determined to have the highest rank. In some embodiments, the ranks for each message for each criterion may be normalized to generate an $r_{i,j}$, where r represents the normalized rank of message j under criterion i. For example, each message in the inbox may have a normalized rank under the "sender" criterion, $r_{sender,j}$. In some embodiments, the prioritization system 140 may also assign a weight, w, to each criterion, i, as $w_i$. In these and other embodiments, the weight assigned to a particular criterion may be representative of the relative significance of the particular criterion compared to other criteria.

For example, in some embodiments, the relative significance of each criterion may be based on a correlation between the criterion and the user's response time to the message. In these and other embodiments, criteria that are more strongly correlated with the response time may be considered to have greater relative significance than criteria that are weakly correlated with the response time. For example, in some embodiments, the sender of the message may be strongly correlated with the user's past response times to messages. For example, when the sender of the message is the user's supervisor, the user may respond to messages within an hour. In contrast, in some embodiments, the time the message was sent may be weakly correlated with the response time of the user. In these and other embodiments, the sender of the message may be determined to have greater relative significance than the time the message was sent. The sender of the message may be assigned a greater weight than the time the message was sent.

In some embodiments, criteria that are determined to be more significant may have a higher weight than criteria that are determined to be less significant. In these and other embodiments, the weight for each criterion may be determined based on collected historical data of the user's message usage. In some embodiments, the weights may be determined based on a least squares regression analysis of the criteria against different user actions. For example, in some embodiments, the weights may be regression coefficients of a regression of the criteria against the user's response time to the messages, the user's time before reading each message, the user's time before deleting each message, and/or the user's time before forwarding each message. For example, in some embodiments, the weight of the sender of the message may be the regression coefficient of the sender against the user's time before reading the message. In these and other embodiments, the weight of the subject of the message may be the regression coefficient of the subject of the message against the user's time before reading the message.

Alternatively or additionally, in some embodiments, the weight for each criterion may be determined based on feedback from the user. For example, in these and other embodiments, the user may assign a weight of 2 to the sender of the message, a weight of 1.5 to the subject of the message, and a weight of 1 to the time the message was sent. Alternatively or additionally, the user may assign weights to other criteria. The prioritization system 140 may determine a combined normalized rank of each message by combining the weight for each criterion $w_i$ and the normalized rank of the message under each criterion $r_{i,j}$ to generate $R_j = \Sigma_i r_{i,j} \times w_i$ where $R_j$ represents the combined normalized rank R of message j. The prioritization system 140 may prioritize the messages in descending order based on the combined normalized rank R of each message. In some embodiments, users may tend to not open particular messages. In these and other embodiments, the prioritization system 140 may assign a minimal rank to the particular messages. In these and other embodiments, the user device 120 may present the particular messages to the user at some predetermined point in time.

The cognitive cost calculator 150 may be configured as desired to determine a cognitive cost associated with each message in the inbox of the user device 120. In some embodiments, the cognitive cost calculator 150 may be configured to obtain cognitive load information associated with one or more messages being handled by a user. Cognitive load may include a total mental workload experienced by a user. For example, cognitive load may be a measure of the mental exertion currently being experienced by an individual—the greater the current cognitive load of the user, the greater the amount of mental effort the user is exerting. Cognitive cost may include the additional cognitive load that will be experienced by an individual in order to handle a particular added message—the greater the cognitive cost, the greater the additional cognitive load of an individual when handling the particular message. In some embodiments, the cognitive load information may include user-inputted criteria based on one or more messages handled by the user. For example, in these and other embodiments, the user may provide self-rated scales, think-aloud protocols, and/or post-task interviews in response to handling a message. For example, a user may rate each message after handling the message. In these and other embodiments, the user may rate messages on a scale of 1 to 10 based on the user's self-determined cognitive cost of addressing the message. Alternatively or additionally, the user may engage in a think-aloud protocol during or after handling the message. During the think-aloud protocol, the user may verbalize what is going through the user's mind while handling the message. The think-aloud protocol may be used to determine the cognitive cost associated with the message based on the ideas expressed by the user. Alternatively or additionally, the user may be interviewed after handling a message to determine how the user would rate the cognitive cost of the message.

Alternatively or additionally, in some embodiments, the cognitive cost calculator 150 may be configured to obtain performance measures associated with handling the messages. In these and other embodiments, the performance measures may include a number of errors associated with the user's handling of the messages, accuracy, handling time relative to a population handling time of the message or similar messages, and a ratio of the actual completion time to an ideal completion time. In these and other embodiments, performance measures may be associated with the cognitive cost of a message. For example, in some embodiments, a greater number of errors, a longer handling time, and/or a higher ratio of the actual completion time to an ideal completion time may each be associated with a higher cognitive cost as desired.

Alternatively or additionally, in some embodiments, the cognitive cost calculator 150 may be configured to obtain physiological measurements of the user such as, for example, electroencephalography (EEG), functional near infrared spectroscopy, eye-tracking, and heart rate variability. In these and other embodiments, eye-tracking may include measuring a pupil size of a user, measuring the blinks of the user, determining a location of focus for eyes of the user, and other information about the eyes of the user. In these and other embodiments, physiological measurements of the user may be obtained from the measurement device 170. In these and other embodiments, physiological measurements may be associated with the cognitive cost of a message. For example, in some embodiments, measurements from electroencephalography may show more brain activity while handling a message with a higher cognitive cost than while handling a message with a lower cognitive cost. Similarly, the heart rate of a user may increase more while handling a message with a higher cognitive cost than while handling a message with a lower cognitive load. In some embodiments, pupil size may be positively correlated with the cognitive cost of a message. In these and other embodiments, pupil size may increase as the current cognitive load of the user increases. This may also be associated with the cognitive cost of the message the user is handling. The frequency of blinking for a user may be negatively correlated with cognitive load. For example, as the cognitive load of the user increases, the user may blink less frequently.

In some embodiments, the cognitive cost calculator 150 may be configured to identify determining variables associated with messages. For example, in these and other embodiments, the cognitive cost calculator 150 may identify a sender of the message, a subject of the message, a content of the message, an emotion of the message, a length of the message, a time at which the message was sent, one or more addressees of the message, a type of the message, or other information associated with the message. In these and other embodiments, the cognitive cost calculator 150 may determine a correlation between one or more of the determining variables associated with messages and the associated cognitive loads associated with the message.

In some embodiments, in response to receiving a new message in the inbox of the user device 120, the cognitive cost calculator 150 may determine whether the message includes any of the determining variables that were identified in other messages and correlated with cognitive load information. In some embodiments, in response to determining that the message does not include any determining variables, the cognitive cost calculator 150 may assign the message a minimum cognitive cost and a high priority. In these and other embodiments, assigning the message a minimum cognitive cost and a high priority may result in the message being presented to the user earlier than if the message were assigned a higher cognitive cost and/or a lower priority. Alternatively or additionally, in some embodiments, in response to determining that the message does not include any determining variables, the cognitive cost calculator 150 may assign the message a higher cognitive cost and/or a lower priority.

In response to determining that the message includes one or more determining variables, the cognitive cost calculator 150 may identify the correlations between identified determining variables and the cognitive cost of the message. In these and other embodiments, the cognitive cost calculator 150 may use the correlation coefficients, the one or more determining variables identified in the message, and the correlation coefficients for the one or more identified variables to generate a cognitive cost of the message.

The user interruption readiness device 160 may be configured to determine whether the user is ready to handle a new group of messages. In these and other embodiments, user readiness may be determined based on different factors. For example, in some embodiments, user readiness may be determined based on a schedule of the user, a location of the user, and a current cognitive load of the user.

The user interruption readiness device 160 may be configured to obtain a schedule of the user. For example, in some embodiments, the user interruption readiness device 160 may obtain the schedule of the user via a calendar application. The schedule of the user may include appointments, meetings, deadlines, regular working hours, and other information associated with activities of the user. For example, in some embodiments, the schedule of the user may include a daily work schedule. For example, the daily work schedule of the user may begin at 7:00 AM and may end at 6:00 PM. In some embodiments, the user may be determined to not be ready to handle a new group of messages during times outside of the daily work schedule. In some embodiments, the user may be determined to be ready to handle a new group of messages at a particular time when the schedule of the user does not include another activity at the particular time and the particular time is during the daily work schedule or the particular activity is designated as an activity during which the user may respond to messages. In these and other embodiments, the user may designate types of activities during which the user is available to handle messages. For example, in some embodiments, the user may indicate that messages may be handled during training meetings, during lunch meetings, or during other meetings.

Alternatively or additionally, in some embodiments, the user interruption readiness device 160 may use machine learning to identify the types of meetings or appointments during which the user may process messages. For example, in some embodiments, the user interruption readiness device 160 may use historical data from the schedule of the user and from the user's processing of messages to identify activities during which the user has processed messages in the past. Based on past message processing activity of the user, the user interruption readiness device 160 may determine that the user is available to handle messages during similar activities in the future.

The user interruption readiness device 160 may also be configured to identify a location of the user. For example, in some embodiments, the user interruption readiness device 160 may determine that a user is not ready to respond to messages in response to determining that the user is not located at the user device 120. In these and other embodiments, the user interruption readiness device 160 may determine that the user is not at the user device 120 in response to determining that no activity is occurring on the user device 120. For example, in some embodiments, the user interruption readiness device 160 may obtain information from one or more input devices associated with the user device 120 such as a touchscreen, a keyboard, and/or a mouse. In response to determining that movement is occurring via the mouse, the user interruption readiness device 160 may determine that the user is located at the user device 120. For example, in some embodiments, the user interruption readiness device 160 may determine whether the user is at work, at home, or at another location. For example, some locations may indicate that the user is not currently working and is not available to handle messages. For example, in some embodiments, the user interruption readiness device 160 may determine that the user is currently at the beach, in the mountains, at an amusement park, or at another location associated with vacation. In these and other embodiments, the user interruption readiness device 160 may determine that the user is not ready to respond to messages. Alternatively or additionally, in some embodiments, the user may specify the location of the user.

The user interruption readiness device 160 may further be configured to determine a current cognitive load of the user. In these and other embodiments, the user interruption readiness device 160 may determine the current cognitive load of the user in a manner similar to that discussed above with reference to identifying the cognitive cost associated with messages. For example, in these and other embodiments, the user interruption readiness device 160 may be configured to obtain a user-inputted current cognitive load. In these and other embodiments, the user-inputted current cognitive load may include self-rated scales, think-aloud protocols, and/or post-task interviews in response to handling a message. Alternatively or additionally, in some embodiments, the user interruption readiness device 160 may be configured to obtain performance measures associated with handling tasks. In these and other embodiments, the performance measures may include a number of errors associated with the user's handling of the tasks, accuracy, completion time relative to a population completion time of the task, and a ratio of the actual completion time to an ideal completion time. Alternatively or additionally, in some embodiments, the user interruption readiness device 160 may be configured to obtain physiological measurements of the user such as, for example, electroencephalography (EEG), functional near infrared spectroscopy, eye-tracking, and heart rate variability. In these and other embodiments, physiological measurements of the user may be obtained from the measurement device 170. In these and other embodiments, the physiological measurements of the user may be associated with different measurements of current cognitive load.

In some embodiments, the user interruption readiness device 160 may also be configured to obtain a threshold cognitive load. In these and other embodiments, the presentation of messages to the user may be selected such that the cognitive load of the user does not exceed the threshold cognitive load. For example, in these and other embodiments, the current cognitive load of the user plus the total cognitive cost of a group of messages to be presented to the user may be less than or equal to the threshold cognitive cost.

In some embodiments, the threshold cognitive load may be determined based on the user's cognitive load in the past when the user refused to handle messages. For example, in some embodiments, the user interruption readiness device 160 may identify the historical cognitive load of the user when the user processed a group of messages and when the user did not process a group of messages. In these and other embodiments, the threshold cognitive load may be an average of the user's historical cognitive load when the user refused to handle messages.

The measurement device 170 may include one or more devices configured to obtain a physiological measurement of a user. For example, in some embodiments, the measurement device 170 may include one or more cameras, one or more electrodes, and/or one or more other devices configured to obtain physiological measurements of a user. In some embodiments, the measurement device 170 may be a part of the user device 120. For example, in some embodiments, the user device 120 may be a laptop computer and the measurement device 170 may be a camera integrated with the laptop computer. Alternatively or additionally, in some embodiments, the measurement device 170 may be communicatively coupled with the user device 120, such as, for example, via the network 110.

The user device 120 may be configured to identify a group of messages to present to the user. In some embodiments, presenting a group of messages to the user rather than presenting a single message to the user may reduce the number of notifications received by the user such that the number of interruptions experienced by the user are reduced or minimized. In these and other embodiments, reducing the number of notifications received by the user may improve the efficiency of the user in handling messages and in performing other tasks.

The user device 120 may be configured to obtain a threshold number of messages. In these and other embodiments, the threshold number of messages may be the minimum group size of the messages presented to the user at one time. In these and other embodiments, the messages may include messages that the user has not read. Alternatively or additionally, in some embodiments, the messages may include messages that the user has not responded to. For example, in some embodiments, the threshold number of messages may be twenty messages. In these and other embodiments, the user device 120 may not present messages to the user until the user device 120 has at least twenty unread messages. Alternatively or additionally, in some embodiments, the user device 120 may not present messages to the user until the user device 120 has at least twenty messages that have not been handled by the user. For example, in some embodiments, the user device may select a number of messages equal to the threshold number such that selected messages have the highest priority of the messages in the inbox of the user device and such that a sum of the current cognitive load of the user and a total cognitive cost of the selected messages is less than or equal to the threshold cognitive load. For example, the threshold number of messages may be n. The user device 120 may select n messages such that: $(\Sigma_{i=1}^{n} \alpha_1)$+Current cognitive load of the user<Threshold cognitive load of the user, where $\alpha_i$ represents the cognitive cost of processing message i.

Two example operations of the environment 100 is as follows. The user device 120 may include an inbox associated with an account of a user. The inbox may include multiple messages sent to the user device. In these and other embodiments, the messages may include senders, subjects, contents, dates received, due dates, associated calendar items, and other associated data.

In a first example operation, the user of the user device 120 is handling messages and a new message is received in the inbox of the user device 120. The prioritization system 140 may determine the importance of the received message and the priority of the received message and the cognitive cost calculator 150 may determine the cognitive cost of the received message. If the importance of the received message satisfies a threshold importance, the message may be presented to the user. If the importance of the received message does not satisfy the threshold importance, the user device 120 may compare the priority of the received message with the priorities of each message in the group of messages that the user is currently processing. In some embodiments, the importance of the received message may satisfy the threshold importance when the importance of the received message is greater than the threshold importance. Alternatively, in some embodiments, the importance of the received message may satisfy the threshold importance when the importance of the received message is greater than or equal to the threshold importance. Alternatively, in some embodiments, the importance of the received message may satisfy the threshold importance when the importance of the received message is less than or equal to the threshold importance. Alternatively, in some embodiments, the importance of the received message may satisfy the threshold importance when the importance of the received message is less than the threshold importance. If the received message does not have a priority higher than any of the messages of the group of messages, the user may continue to process the group of messages. However, if the received message has a priority higher than at least one message of the group of messages, a new group of messages may be presented to the user. The new group of messages may include the messages from the group of messages and the received message with the highest priorities such that a sum of the current cognitive load of the user and the total cognitive cost of each message of the new group of messages is less than the threshold cognitive load.

In a second example operation, the user of the user device 120 is not handling messages. The messages in the inbox of the user device 120 may have previously been prioritized by the prioritization system 140 and a cognitive cost associated with each message of the inbox of the user device 120 may have previously been determined. The user interruption readiness device 160 may monitor the current cognitive load of the user and determine when the user may be ready to handle a group of messages. In these and other embodiments, the user may be determined to be ready to handle a group of messages based on the cognitive cost of the messages in the inbox and based on the factors discussed above with respect to the user interruption readiness device 160. In response to identifying a number of messages such that the sum of the current cognitive load of the user and a total cognitive cost of the messages is less than the threshold cognitive load and in response to determining that the user is ready to process a group of messages, the messages may be presented to the user.

Modifications, additions, or omissions may be made to the environment 100 without departing from the scope of the present disclosure. For example, in some embodiments, the measurement device 170 may be a part of the user device 120. Alternatively or additionally, in some embodiments, one or more of the inbox status observer 130, the prioritization system 140, the cognitive cost calculator 150, and the user interruption readiness device 160 may be combined into one device, separated into additional devices, and/or perform additional operations. In some embodiments, the user device 120, the communication device 180A, and the communication device 180B may be associated with a single corporation, with a single educational institution, and/or with a single body. In some embodiments, the environment 100 may include ten communication devices 180, one hundred communication devices 180, one thousand communication devices 180, or any other number of communication devices 180.

FIGS. 2A, 2B, 2C, and 2D depict an example process of electronic message management. The process 200 may be arranged in accordance with at least one embodiments described in the present disclosure. The process 200 may be performed, in whole or in part, in some embodiments, by a system and/or environment, such as the environment 100 and/or the system 500 of FIGS. 1 and 5, respectively. In these and other embodiments, the process 200 may be performed based on the execution of instructions stored on one or more non-transitory computer-readable media. Although illustrated as discrete blocks, various blocks may be divided into additional blocks, combined into fewer blocks, or eliminated, depending on the desired implementation.

The process 200 may begin at block 202, where a threshold cognitive load of a user may be obtained. In some embodiments, the threshold cognitive load of the user may be determined based on historical measurements of the cognitive load when a user has declined to handle messages when presented with a group of messages. Alternatively or additionally, in some embodiments, the threshold cognitive load of the user may be based on a selection by the user. For example, in these and other embodiments, the user may determine the threshold cognitive load. For example, in some embodiments, the user may select cognitive load above which the user would prefer to not work. For example, in some embodiments, the user may select to stop handling messages while handling a group of messages. In these and other embodiments, the cognitive load of the user when the user selects to stop handling messages may be determined to be the threshold cognitive load.

In block 204, a threshold importance may be obtained. Messages that are associated with an importance satisfying the threshold importance may be presented to the user when received rather than in a group of messages. For example, upon receipt of a message with an importance satisfying the threshold importance, the message may be presented to the user immediately, without presenting other messages in a group of messages to the user. In some embodiments, the threshold importance may be based on the historical importance of messages handled by the user. For example, in some embodiments, the importance of messages handled by a user shortly after receipt of the message may be used to determine the threshold importance. For example, in some embodiments, the average importance of messages handled by the user shortly after receipt may be used as the threshold importance. Alternatively or additionally, in some embodiments, the threshold importance may be based on a selection by the user. For example, in some embodiments, when handling messages, a user may select an option to present similar messages when received in the future. In these and other embodiments, when a message similar to the handled message is received, the user device 120 may present the message to the user upon receipt of the message. Alternatively or additionally, in some embodiments, the user may enter a threshold importance using the same scale as the calculated importance discussed below with respect to block 210.

In block 206, multiple first messages in an inbox of the user may be obtained. Each message of the multiple first messages may be associated with a cognitive cost and an importance. In some embodiments, the cognitive cost of each message of the multiple first messages may be determined based on values associated with the message and a correlation between the cognitive costs and values associated with historical messages received by the user. For example, in some embodiments, the cognitive cost of historical messages may be determined based on user-submitted feedback regarding the cost of handling historical messages, performance measurements of the user's handling of the historical messages, and/or physiological measurements of the user while the user is handling the historical messages. In these and other embodiments, values associated with the historical messages may be identified, such as a sender of the message, a subject of the message, a content of the message, a time the message was sent, and/or other values associated with the messages. The cognitive costs of the historical messages may be correlated with the values associated with the historical messages.

In some embodiments, the importance of each message of the multiple first messages may be determined based on values associated with the message and a correlation between the values associated with the historical messages and response times to the messages, deletion times of the messages, and/or cultural norms regarding the messages. For example, in some embodiments, key words may be identified in messages that may be associated with importance such as "urgent," "ASAP," "rush," "today," or other words. Alternatively or additionally, some senders may be identified as more important. For example, in some embodiments, messages from a supervisor of the user may be determined to be more important than messages from other individuals. Alternatively or additionally, other values associated with the messages, such as the subject of the messages, the content of the messages, deadlines in the messages, may be correlated with the importance of the messages. In these and other embodiments, different values associated with messages may be assigned different weights. In these and other embodiments, the importance of the messages may be a weighted combination of the values associated with the messages.

In block 208, it may be determined whether a new message has been received in the inbox. In response to determining that a new message has been received in the inbox ("Yes" at block 208), the process 200 may proceed to block 210. In response to determining that a new message has not been received in the inbox ("No" at block 208), the process 200 may proceed to block 212. In some embodiments, the presence of a new message in the inbox of the user may be provided by a program or application associated with the inbox of the user device. For example, in some embodiments, a macro may be written which may provide notification of the receipt of a new message in the inbox.

In block 212, it may be determined if the user is handling a first group of messages. In response to the user not handling a first group of messages ("No" at block 212), the process may proceed to block 234. In response to the user handling a first group of messages, the process may return to bock 206. In some embodiments, the process 200 may determine whether a user is handling a first group of messages based on key logging, application monitoring, detecting new sent messages in the inbox of the user and/or eye-tracking. For example, in some embodiments, the process 200 may determine that the user is handling a first group of messages based on identifying input into a user device 200 received from a keyboard or mouse while a messaging application is active on the user device. Alternatively or additionally, in some embodiments, the process 200 may determine that the user is handling a first group of messages based on identifying one or more new sent messages in the inbox of the user. Alternatively or additionally, in some embodiments, the process 200 may determine that the user is handling a first group of messages based on determining that the user's eyes are focused on a messaging application on a display of the user device.

In block 210, an importance of the received message may be determined. In some embodiments, the importance of the received message may be determined based on identifying different values associated with the received message. The identified values may be combined using different weights as discussed above with respect to block 206 to determine the importance of the received message.

In block 214, the importance of the received message may be compared with the threshold importance. In block 216 it may be determined whether the importance of the received message satisfies the threshold importance. In response to the importance of the received message satisfying the threshold importance ("Yes" at block 216), the process may proceed to block 218. In response to the importance of the received message not satisfying the threshold importance ("No" at block 216), the process may proceed to block 220.

In block 218, the received message may be presented to the user. In some embodiments, the received message may be presented on a display of a user device. For example, in some embodiments, a notification may be displayed as a pop-up window, notifying the user that the user has received an important message.

In block 220, a priority of the received message may be determined with respect to the multiple first messages in the inbox based on the importance of the received message and the importance of each message of the multiple first messages. In some embodiments, the priority of the received message may be determined by comparing the importance of the received message with the importance of each message of the multiple first messages. A message with a greater importance than another message may be determined to have a higher priority. In these and other embodiments, the priorities of the messages may correspond with the importance of the messages.

In block 222, a cognitive cost of the received message may be determined. In some embodiments, the cognitive cost of the received message may be determined by identifying values associated with the received message and by using the correlation of the values associated with historical messages with the cognitive cost of historical messages discussed above with respect to block 206. For example, values associated with the received message may be identified. For example, the values may include a sender of the message, a subject of the message, a content of the message, a time the message was sent, and/or other values associated with the received message. Based on the values and the correlation between the cognitive costs and the values associated with historical messages received by the user discussed above with respect to block 206, a cognitive cost for the received message may be determined. For example, the values may be combined using the weights discussed above to determine the cognitive cost.

In block 224, a current cognitive load of the user may be obtained. In some embodiments, the current cognitive load of the user may be determined based on a self-assessment by the user, by performance measurements of the user, and/or by physiological measurements of the user. For example, in some embodiments, the current cognitive load of the user may be determined based on eye-tracking, including pupil size measurement.

In block 226, it may be determined if the user is handling a first group of messages. In response to the user handling a first group of messages ("Yes" at block 226), the process 200 may proceed to block 228. In response to the user not handling a first group of messages ("No" at block 226), the process 200 may proceed to block 234. In some embodiments, the determination of whether a user is handling a first group of messages may be substantially similar to the determination in block 212.

In block 228, the priority of the received message may be compared with the priority of each message in the first group of messages.

In block 230, a second group of messages of the first group of messages and the received message may be identified to present to the user. The second group of messages may have the highest priorities of the messages of the first group of messages and the received message. The second group of messages may be selected such that a sum of the current cognitive load and a total cognitive cost of the second group of messages is less than the threshold cognitive load. In some embodiments, the second group of messages may include the received message based on the priority of the received message being higher than a priority of at least one message of the first group of messages. For example, in some embodiments, a number, n, of messages of the first group of messages and the received message may be selected such that: $(\Sigma_{i=1}^{n} \alpha_i)$+Current cognitive load of the user<Threshold cognitive load of the user, where $\alpha_i$ represents the cognitive load of the ith message of the second group of messages. In some embodiments, the number of messages in the second group of messages, n, may be equal to the number of messages in the first group of messages. In these and other embodiments, the received message may replace one message of the first group of messages in the second group of messages. Alternatively or additionally, in some embodiments, n may be equal to the number of messages in the first group of messages plus one. In these and other embodiments, the received message may be added to the first group of messages to generate the second group of messages. Alternatively or additionally, in some embodiments, the number of messages in the second group of messages may be any number between one and the number of messages in the first group of messages plus one.

In block 232, the second group of messages may be presented to the user. In some embodiments, the second group of messages may be presented on a display of a user device.

In block 234, a threshold user readiness of the user may be obtained. In some embodiments, the threshold user readiness may be obtained based on input from a user. For example, in these and other embodiments, the user may indicate a threshold user readiness. Alternatively or additionally, in some embodiments, the threshold user readiness may be determined based on historical data from the user. For example, in these and other embodiments, the threshold user readiness may be an average of the cognitive load of the user when the user declines to handle messages when presented with a group of messages.

In block 236, a user readiness of the user may be obtained. In some embodiments, the user readiness may be a combination of a schedule of the user, a location of the user, and a current cognitive load of the user. For example, the process 200 may include determining one or more available times based on the schedule of the user. Available times may include times without another scheduled activity and/or times with scheduled activities which have been determined to be available for handling messages. For example, in some embodiments, a user may designate particular meetings or particular types of meetings as times available for handling messages. Alternatively or additionally, in some embodiments, particular types of meetings may be determined to be available for handling messages based on historical data of the user handling messages during the particular types of meetings.

Alternatively or additionally, the process 200 may include determining a location of the user. For example, in some embodiments, the process 200 may determine whether the user is currently located at the user device. In these and other embodiments, the location of the user may be determined based on keylogging or other input detection at the user device. Alternatively or additionally, the process 200 may include determining a current cognitive load of the user. In some embodiments, the user readiness of the user may be a combination of the schedule of the user, the location of the user, and the current cognitive load of the user.

In block 238, a threshold number of messages may be obtained. In some embodiments, the threshold number of messages may be obtained from the user. For example, in these and other embodiments, the user may select a minimum number of messages to present to the user. For example, the user may set the threshold number of messages to twenty messages. In these and other embodiments, messages may be presented to the user when the user has at least twenty messages to handle. Alternatively or additionally, in some embodiments, the threshold number of messages may be obtained based on past practices of the user. For example, in these and other embodiments, the process 200 may include determining an average number of messages handled by the user when the user is handling messages during a certain period of time. In these and other embodiments, the average number of messages handled may be determined to be the threshold number of messages.

In block 240, it may be determined if the user readiness satisfies the threshold user readiness. In response to the user readiness not satisfying the threshold user readiness ("No" at block 240), the process 200 may return to block 206. In response to the user readiness satisfying the threshold user readiness ("Yes" at block 240), the process 200 may proceed to block 242.

In block 242, it may be determined if there is a third group of messages such that a sum of the current cognitive load and a total cost of the third group of messages is less than the threshold cognitive load. The number of messages in the third group of messages may be greater than or equal to the threshold number. The third group of messages may have the highest priorities of messages in the multiple first messages and the received message. For example, the third group of messages may be selected starting with the message with the highest priority. Additional messages may be selected based on the priorities of the messages while the sum of the current cognitive load of the user and the total cost of the third group of messages is less than the threshold cognitive load. If the number messages of the selected third group of messages is greater than or equal to the threshold number, the condition of block 242 may be satisfied. For example, in some embodiments, the process 200 may determine whether there exists an n greater than or equal to the threshold number such that $(\Sigma_{i=1}\alpha_i)$+Current cognitive load of the user<Threshold cognitive load of the user, where $\alpha_i$ represents the cognitive load of the ith message of the multiple first messages and the received message based on the priority of the messages. For example, i=1 may represent the message with the highest priority, i=2 may represent the message with the second highest priority, and so on. In response to there not being a third group of messages ("No" at block 242), the process 200 may return to block 206. In response to there being a third group of messages ("Yes" at block 242), the process 200 may proceed to block 244.

In block 244, the third group of messages may be presented to the user. In some embodiments, the third group of messages may be presented to the user on a display of a user device.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. For example, blocks 222 and 224 may be performed prior to blocks 216. Alternatively or additionally, the process 200 may further include determining a correlation between determining variables of messages and cognitive costs of the messages.

Figure 3:
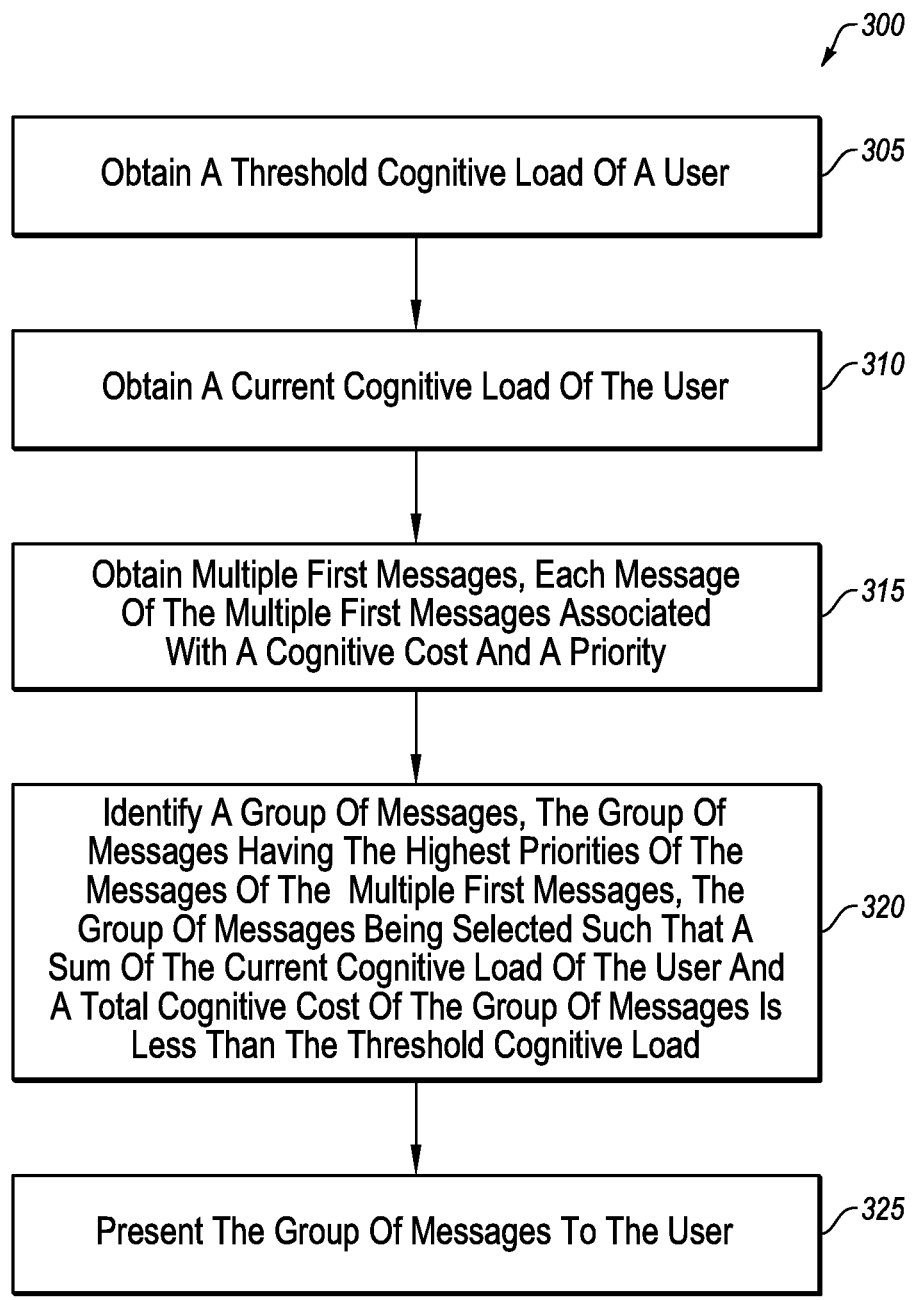
FIG. 3 depicts a flowchart of an example method of electronic message management.

FIG. 3 is a flowchart of an example method of electronic message management. The method 300 may be arranged in accordance with at least one embodiment described in the present disclosure. The method 300 may be performed, in whole or in part, in some embodiments by a system and/or environment, such as the environment 100 and/or the system 500 of FIGS. 1 and 5, respectively. In these and other embodiments, the method 300 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 300 may begin at block 305, where a threshold cognitive load of a user may be obtained. In block 310, a current cognitive load of the user may be obtained. In some embodiments, obtaining the current cognitive load may include combining one or more of a performance measurement of the user and a physiological measurement of the user to generate the current cognitive load.

In block 315, multiple first messages may be obtained. Each message of the multiple first messages may be associated with a cognitive cost and a priority. In some embodiments, each cognitive cost associated with a particular message of the multiple first messages includes a weighted combination of multiple values associated with the particular message. In some embodiments, each priority associated with a particular message of the multiple first messages includes a ranking of an importance associated with the particular message relative to an importance of each other message of the multiple first messages. In some embodiments, the importance associated with the particular message may include a weighted combination of one or more social norms related to values associated with the particular message, a subject of the particular message, and a content of the particular message.

In block 320, a group of messages may be identified. The group of messages may have the highest priorities of the messages of the multiple first messages. The group of messages may be selected such that a sum of the current cognitive load of the user and a total cognitive cost of the group of messages is less than the threshold cognitive load.

In block 325, the group of messages may be presented to the user.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 4:
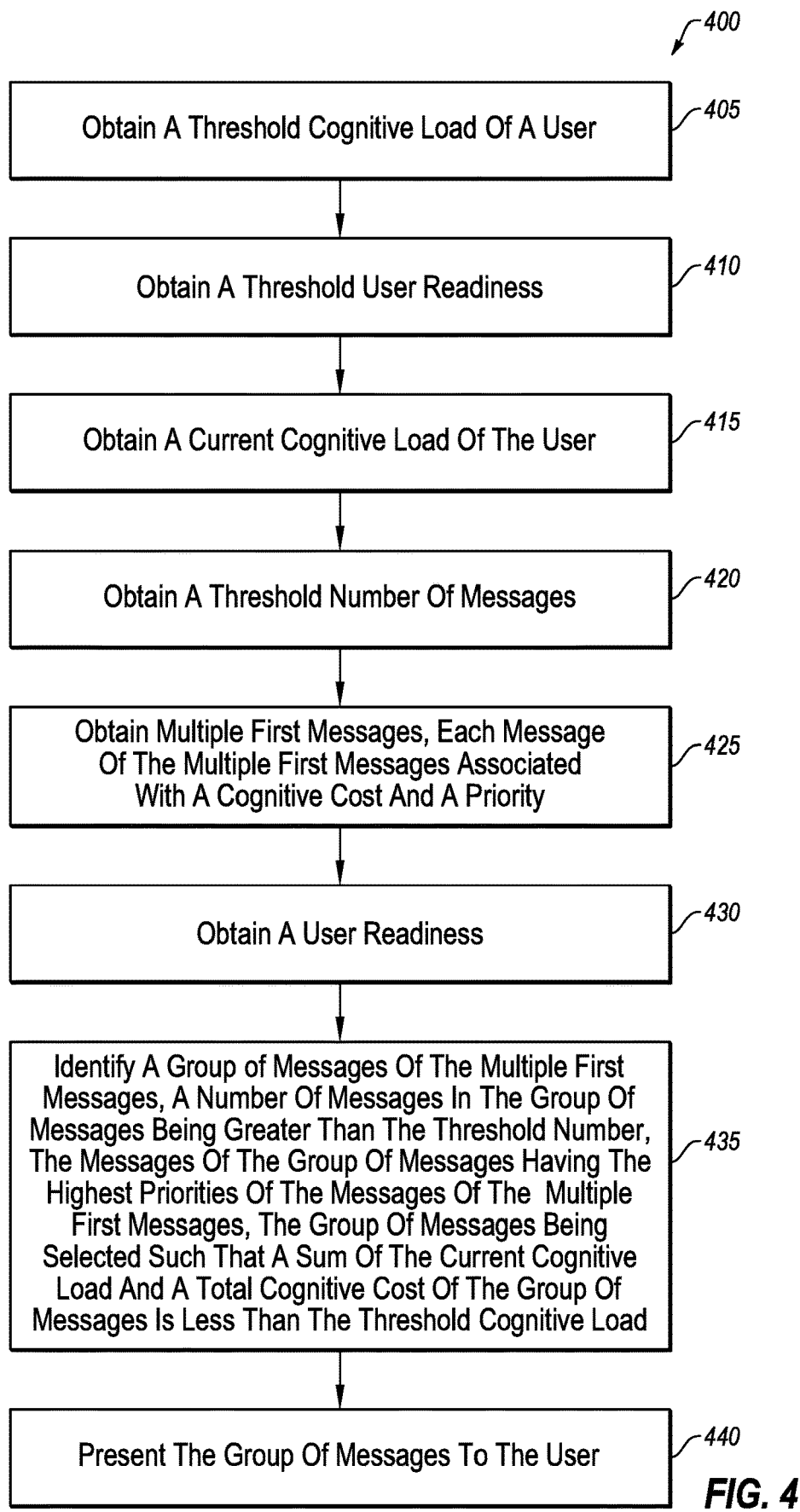
FIG. 4 depicts a flowchart of another example method of electronic message management.

FIG. 4 is a flowchart of another example method of electronic message management. The method 400 may be arranged in accordance with at least one embodiment described in the present disclosure. The method 400 may be performed, in whole or in part, in some embodiments by a system and/or environment, such as the environment 100 and/or the system 500 of FIGS. 1 and 5, respectively. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may begin at block 405, where a threshold cognitive load of a user may be obtained. In block 410, a threshold user readiness may be obtained. In some embodiments, the readiness may include one or more of a schedule of the user, a location of the user, and a current cognitive load of the user. In block 415, the current cognitive load of the user may be obtained. In some embodiments, the current cognitive load of the user includes one or more of a physiological measurement of the user and a performance measurement of the user. In some embodiments, obtaining the current cognitive load of the user may include obtaining a baseline image of a pupil of the user, obtaining a current image of the pupil of the user, comparing the current image with the baseline image, and determining the current cognitive load of the user based on the comparing the current image with the baseline image. In block 420, a threshold number of messages may be obtained.

In block 425, multiple first messages may be obtained. Each message of the multiple first messages may be associated with a cognitive cost and a priority. In some embodiments, each cognitive cost associated with a particular message of the multiple first messages comprises a weighted combination of multiple values associated with the particular message. In some embodiments, each priority associated with a particular message of the multiple first messages may include a ranking of an importance associated with the particular message relative to an importance of each other message of the multiple first messages. In some embodiments, the importance associated with the particular message may include a weighted combination of one or more social norms related to values associated with the particular message, a subject of the particular message, and a content of the particular message. In block 430, a user readiness may be obtained.

In block 435, a group of messages of the multiple first messages may be identified. A number of messages of the group of messages may be greater than the threshold number. The messages of the group of messages may have the highest priorities of the messages of the multiple first messages. The group of messages may be selected such that a sum of the current cognitive load and a total cognitive cost of the group of messages is less than the threshold cognitive load.

In block 440, the group of messages may be presented to the user.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 5:
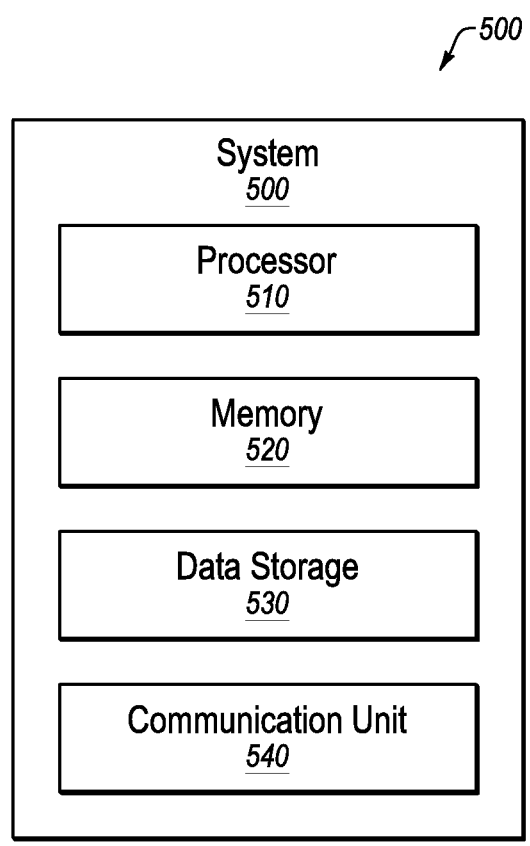
FIG. 5 illustrates an example computing system that may be configured for electronic message management.

FIG. 5 illustrates an example system 500, according to at least one embodiment described herein. The system 500 may include any suitable system, apparatus, or device configured to identify and extract information. The system 500 may include a processor 510, a memory 520, a data storage 530, and a communication device 540, which all may be communicatively coupled. The data storage 530 may include various types of data, such as author objects and social media account objects.

Generally, the processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, the processor 510 may include any number of processors distributed across any number of network or physical locations that are configured to perform individually or collectively any number of operations described herein. In some embodiments, the processor 510 may interpret and/or execute program instructions and/or process data stored in the memory 520, the data storage 530, or the memory 520 and the data storage 530. In some embodiments, the processor 510 may fetch program instructions from the data storage 530 and load the program instructions into the memory 520.

After the program instructions are loaded into the memory 520, the processor 510 may execute the program instructions, such as instructions to perform the process 200 and/or the methods 300 and/or 400 of FIGS. 2, 3, and 4, respectively. Additionally or alternatively, in some embodiments, a prioritization system (e.g., the prioritization system 140 of FIG. 1), a user interruption readiness device (e.g., the user interruption readiness device 160 of FIG. 1), an inbox status observer (e.g., the inbox status observer 130 of FIG. 1), and/or a cognitive cost calculator (e.g., the cognitive cost calculator 150 of FIG. 1) may be included in data storage 530 as program instructions to perform one or more operations of the methods 200, 300, or 400. The processor 510 may fetch the corresponding program instructions and may load the program instructions in the memory 520. After the program instructions are loaded into the memory 520, the processor 510 may execute the program instructions such that the computing system may implement the operations associated with the above-recited components as directed by the instructions.

The memory 520 and the data storage 530 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 510.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 510 to perform a certain operation or group of operations.

The communication unit 540 may include any component, device, system, or combination thereof that is configured to transmit or receive information over a network. In some embodiments, the communication unit 540 may communicate with other devices at other locations, the same location, or even other components within the same system. For example, the communication unit 540 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, and/or others), and/or the like. The communication unit 540 may permit data to be exchanged with a network and/or any other devices or systems described in the present disclosure. For example, the communication unit 540 may allow the system 500 to communicate with other systems, such as the user device 120, the measurement device 170, the communication device 180A, and the communication device 180B of FIG. 1.

Modifications, additions, or omissions may be made to the system 500 without departing from the scope of the present disclosure. For example, the data storage 530 may be multiple different storage mediums located in multiple locations and accessed by the processor 510 through a network.

As indicated above, the embodiments described herein may include the use of a special purpose or general purpose computer (e.g., the processor 510 of FIG. 5) including various computer hardware or software modules, as discussed in greater detail below. Further, as indicated above, embodiments described herein may be implemented using computer-readable media (e.g., the memory 520 or data storage 530 of FIG. 5) for carrying or having computer-executable instructions or data structures stored thereon.

As used herein, the terms "module" or "component" may refer to specific hardware implementations configured to perform the actions of the module or component and/or software objects or software routines that may be stored on and/or executed by general purpose hardware (e.g., computer-readable media, processing devices, and/or others) of the computing system. In some embodiments, the different components, modules, engines, and services described herein may be implemented as objects or processes that execute on the computing system (e.g., as separate threads). While some of the systems and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," and/or others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, and/or others Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method to prioritize email such that a number of interruptions experienced by a user is reduced, the method comprising:
    obtaining a threshold cognitive load of a user;
    obtaining a threshold importance;
    in response to receiving an electronic mail ("email") in an inbox of the user, determining an importance of the received email;
    comparing the importance of the received email with the threshold importance;
    in response to the importance of the received email not satisfying the threshold importance, determining a priority of the received email with respect to a plurality of emails in the inbox based on the importance of the received email;
    determining a cognitive cost of the received email;
    determining that the user is handling a first group of emails of the plurality of emails;
    in response to determining that the user is handling the first group of emails, comparing the priority of the received email with a priority of each email in the first group of emails;
    obtaining a current cognitive load of the user;
    identifying a second group of emails to present to the user, the second group of emails including the received email and one or more emails of the first group of emails, and the second group of emails having the highest priorities of the emails of the first group of emails and the received email, the second group of emails being selected such that a sum of the current cognitive load and a total cognitive cost of the second group of emails is less than the threshold cognitive load; and
    presenting the second group of emails to the user.

2. The method of claim 1, further comprising:
    in response to receiving a second email in the inbox of the user, determining an importance of the second email;
    comparing the importance of the second email with the threshold importance; and
    in response to the importance of the second email satisfying the threshold importance, presenting the second email to the user.

3. The method of claim 1, wherein determining the importance of the received email includes:
    identifying social norms related to emails from a sender of the received email, emails with a subject of the received email, and emails with a content of the received email based on historical emails and response times from a plurality of coworkers of the user; and
    based on the identified social norms, determining the importance of the received email.

4. The method of claim 3, wherein the social norms include one or more of: the received email being important based on a sender of the received email being a supervisor of the user, the received email being important based on one or more coworkers of the user responding to emails similar to the received email quickly, and the received email being important based on prior response times of the user to prior emails received from the sender of the received email.

5. The method of claim 1, wherein obtaining the current cognitive load of the user includes combining one or more of a performance measurement of the user and a physiological measurement of the user to generate the current cognitive load.

6. The method of claim 5, wherein the performance measurement of the user includes a number of errors associated with the user's handling of messages, the user's handling time of the messages relative to a population handling of similar messages, and a ratio of the actual completion time to an ideal completion time and wherein the physiological measurement of the user includes a baseline size of a pupil of the user and a current size of the pupil of the user.

7. The method of claim 1, wherein determining the cognitive cost of the received email includes:
    identifying a plurality of values associated with the received email, the plurality of values associated with the received email including one or more of: a sender of the received email, a subject of the received email, an emotion of the received email, a length of the received email, a time at which the received email was sent, and an addressee of the received email;
    obtaining a plurality of weights associated with the plurality of values, the plurality of weights based on a correlation between cognitive costs of historical emails and pluralities of values associated with the historical emails; and
    based on the plurality of values and the plurality of weights, determining the cognitive cost.

* * * * *

UNITED STATES PATENT AND TRADEMARK OFFICE
CERTIFICATE OF CORRECTION

PATENT NO. : 10,735,367 B2
APPLICATION NO. : 15/668641
DATED : August 4, 2020
INVENTOR(S) : Mirzazad Barijough et al.

Page 1 of 1

It is certified that error appears in the above-identified patent and that said Letters Patent is hereby corrected as shown below:

On the Title Page

In Item (12), delete "Barijough et al." and insert -- Mirzazad Barijough et al. --, therefor.

Signed and Sealed this
Fifteenth Day of September, 2020

Andrei Iancu
*Director of the United States Patent and Trademark Office*